US008803998B2

(12) United States Patent
Wang

(10) Patent No.: US 8,803,998 B2
(45) Date of Patent: Aug. 12, 2014

(54) IMAGE OPTIMIZATION SYSTEM AND METHOD FOR OPTIMIZING IMAGES

(75) Inventor: Guang-Jian Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 451 days.

(21) Appl. No.: 13/169,031

(22) Filed: Jun. 27, 2011

(65) Prior Publication Data

US 2012/0127326 A1 May 24, 2012

(30) Foreign Application Priority Data

Nov. 23, 2010 (CN) .......................... 2010 1 0555225

(51) Int. Cl.
*H04N 5/228* (2006.01)
*G06K 9/00* (2006.01)
(52) U.S. Cl.
USPC ........................................ 348/222.1; 382/167
(58) Field of Classification Search
USPC ................. 348/268–271, 87, 207.1, 348/333.01–333.06; 382/284, 394
See application file for complete search history.

(56) References Cited

U.S. PATENT DOCUMENTS

| 7,221,476 | B2 * | 5/2007 | Nishi et al. | 358/1.9 |
| 8,218,064 | B2 * | 7/2012 | Muramatsu | 348/349 |
| 2010/0073466 | A1 * | 3/2010 | Jones et al. | 348/51 |
| 2010/0265361 | A1 * | 10/2010 | Inoue et al. | 348/231.6 |
| 2011/0043628 | A1 * | 2/2011 | Yun | 348/143 |

* cited by examiner

*Primary Examiner* — Mekonnen Dagnew
(74) *Attorney, Agent, or Firm* — Novak Druce Connolly Bove + Quigg LLP

(57) ABSTRACT

In a system and method for optimizing images, a digital image of an object is captured by an image capturing device, and a standard image of the object is obtained from a storage system of a computing device. The system calculates an image average energy density (IAED) value of the digital image based on RGB (red, green, blue) channels of the digital image, and calculates an IAED value of the standard image based on RGB channels of the standard image. The system is further calculates a difference between the IAED value of the digital image and the IAED value of the standard image, and applies any difference to optimize every pixel point of the digital image to generate optimized pixel points. The system integrates all the optimized pixel points or original pixel points to generate an optimized image for display.

15 Claims, 4 Drawing Sheets

IMAGE OPTIMIZATION SYSTEM AND METHOD FOR OPTIMIZING IMAGES

BACKGROUND

1. Technical Field

Embodiments of the present disclosure relate to image processing systems and methods, and particularly to an image optimization system and a method for optimizing images.

2. Description of Related Art

In general, a user must perform multiple operations to optimize images captured from an image capturing device (e.g., a typical digital camera); such operations are time-consuming and operator dependent. Furthermore, an inexperienced user may obtain suboptimal images increasing the likelihood of an incorrect diagnosis on the images. A common practice is to pre-set image optimization parameters for improving the quality of images captured by the digital camera. Each of the captured images is analyzed to obtain optimized brightness, contrast, and uniformity of the images. However, such techniques only addresses a proportion of the image optimization issues and do not overcome the differences in the levels of light overall, or anomalies caused by reflections of light, which are also critical to image quality.

Therefore, an improved image optimization system method is desirable to address the aforementioned issues.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
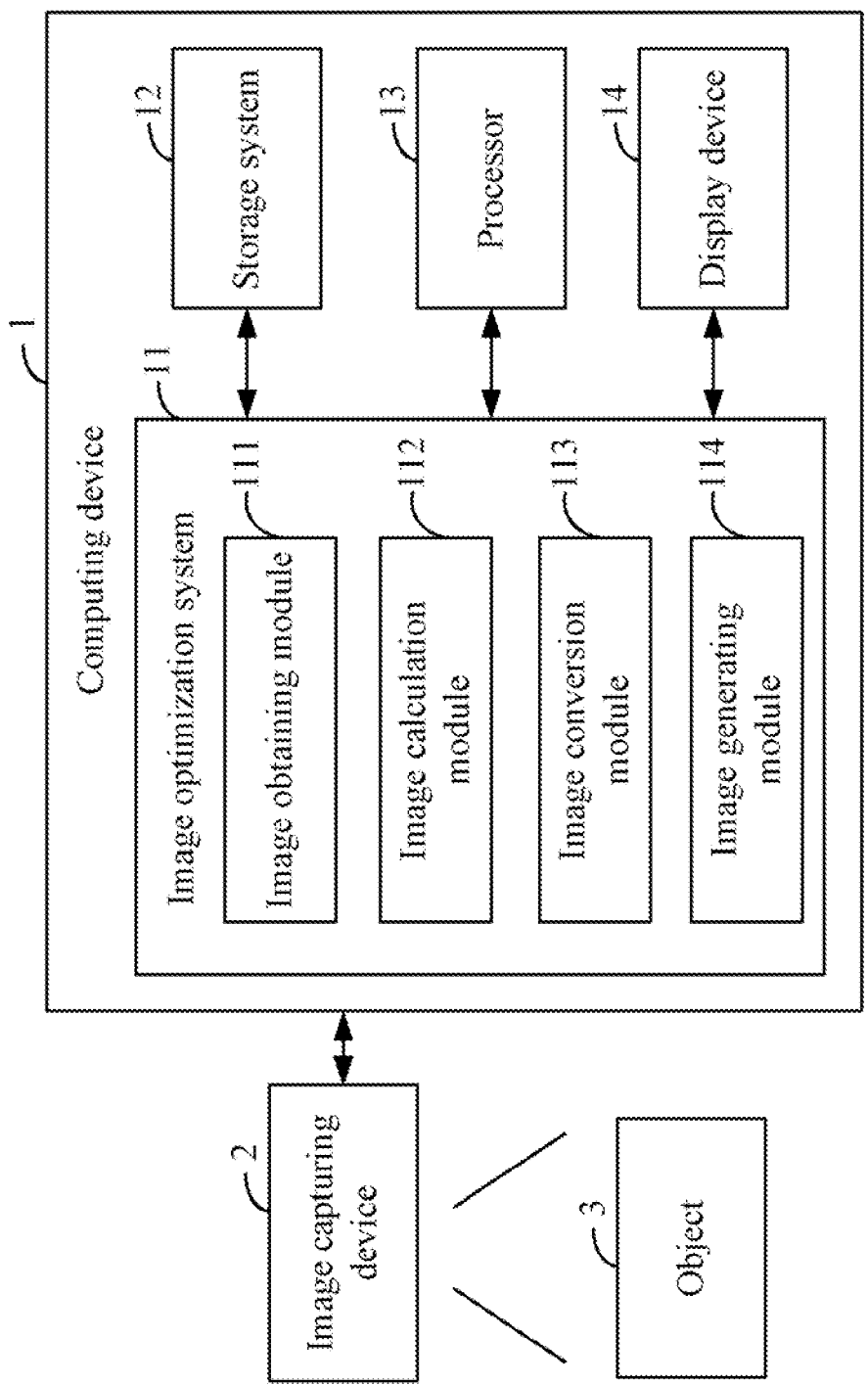
FIG. 1 is a block diagram of one embodiment of a computing device including an image optimization system.
Figure 2:
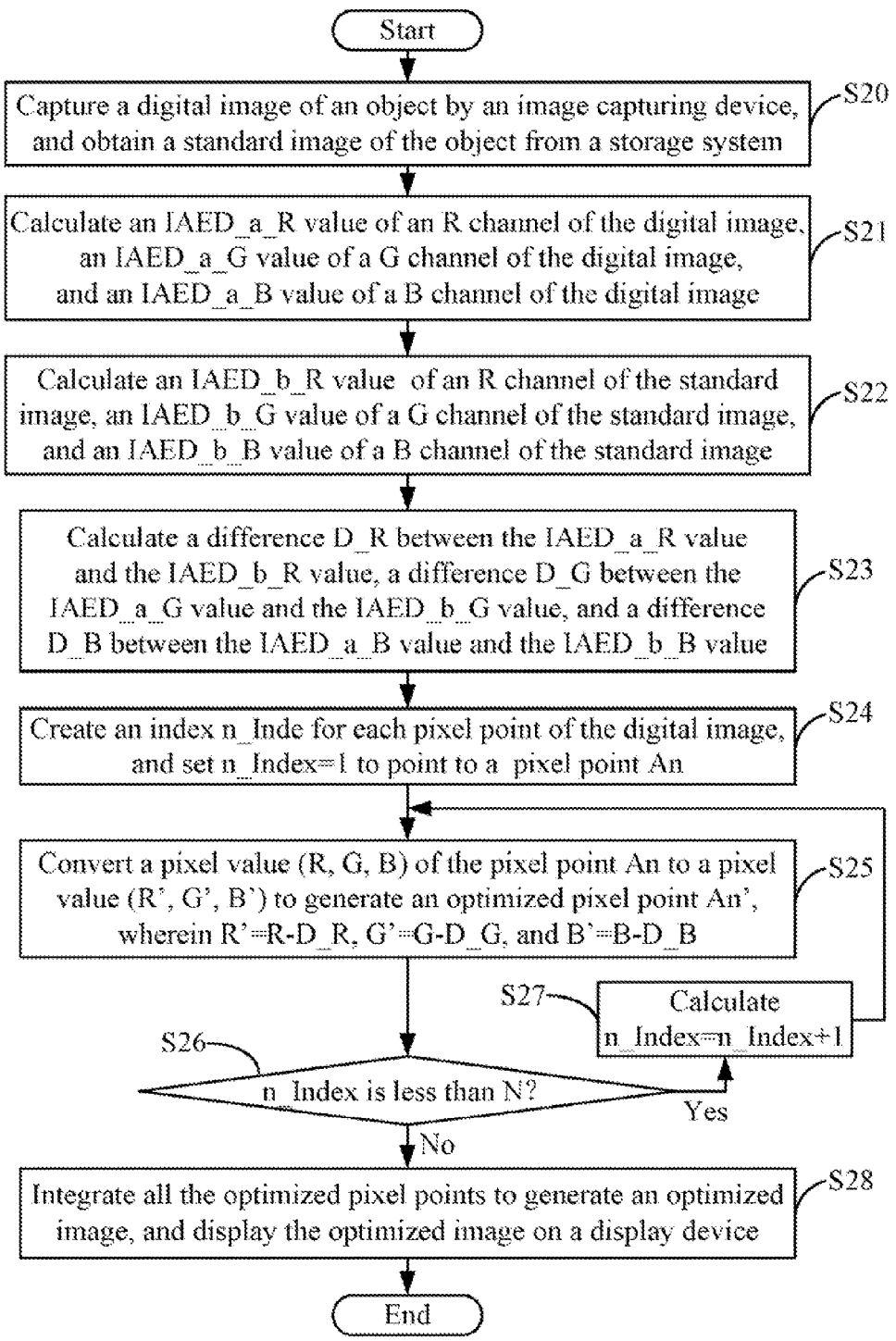
FIG. 2 is a flowchart of one embodiment of a method for optimizing images using the system of FIG. 1.
Figure 3:
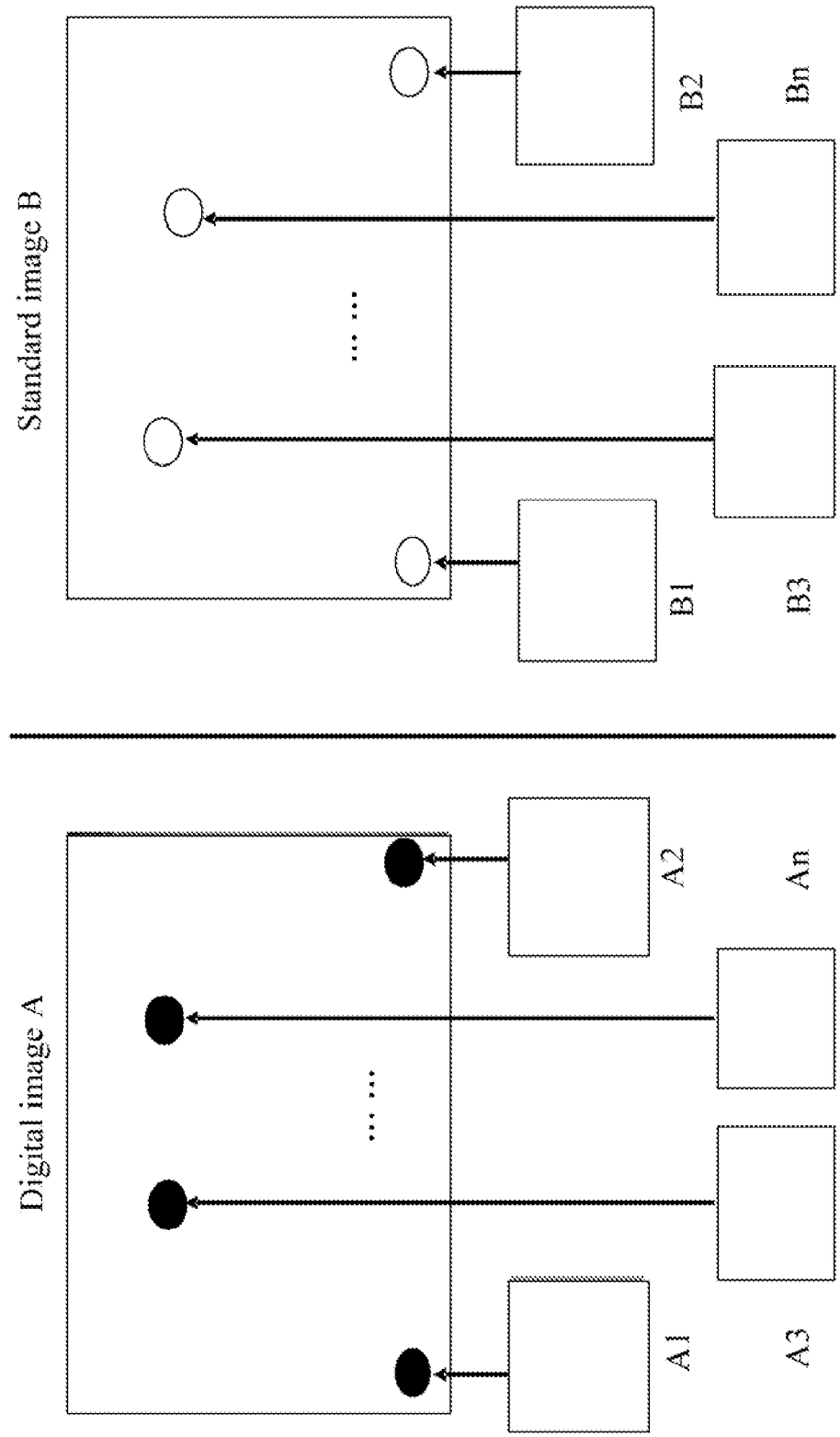
FIG. 3 is a schematic diagram illustrating one example of a digital image and a standard image of an object.

FIG. 1 is a block diagram of one embodiment of a computing device 1 including an image optimization system 11. In the embodiment, the computing device 1 connects to an image capturing device 2 such as a digital camera, for example. The image capturing device 2 is configured to capture a digital image (as shown in FIG. 3) of an object 3, such as a motherboard of a computer, for example. The computing device 1 may further include a storage system 12, at least one processor 13, and a display device 14. The image optimization system 11 can process brightness and contrast of the digital image to create an optimized image of the object 3, even when the digital image is influenced by reflection of a surrounding light or the level changes of the surrounding light. The term "optimize" refers to a process or procedure where the captured image of the object 3 has a higher level of brightness and contrast than that of the digital image.

The storage system 12 stores a standard image of the object 3, as shown in FIG. 3, and one or more programs of the image optimization system 11. The standard image is a reference image of the object 3 having a determined level of brightness and contrast. In one embodiment, the storage system 12 may be an internal storage system, such as a random access memory (RAM) for temporary storage of information, and/or a read only memory (ROM) for permanent storage of information. In some embodiments, the storage system 12 may also be an external storage system, such as an external hard disk, a storage card, or a data storage medium.

In one embodiment, the image optimization system 11 includes an image obtaining module 111, an image calculation module 112, an image conversion module 113, and an image generating module 114. The modules 111-114 may comprise computerized instructions in the form of one or more programs that are stored in the storage system 12, and executed by the at least one processor 13 to provide functions for optimizing the digital image to generate an optimized image of the object 3, and to display the optimized image on the display device 14.

In general, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

The image obtaining module 111 is operable to capture a digital image of the object 3 using the image capturing device 2, and to obtain a standard image of the object 3 from the storage system 12. As shown in FIG. 3, the digital image may be different from the standard image, since the digital image is captured from the object 3 that is influenced by reflection of a surrounding light or the level changes of the surrounding light.

The image calculation module 112 is operable to calculate an image average energy density (IAED) value of the digital image based on RGB (red, green, blue) channels of the digital image, and an IAED value of the standard image based on the RGB channels of the standard image. In one embodiment, the IAED is defined as an image energy density of each pixel point of the image having N*N pixels, and is calculated by a calculation equation IAED=(R+G+B)/N/N, where R represents a pixel value of the R channel, G represents a pixel value of the G channel, and B represents a pixel value of the B channel.

Figure 4:
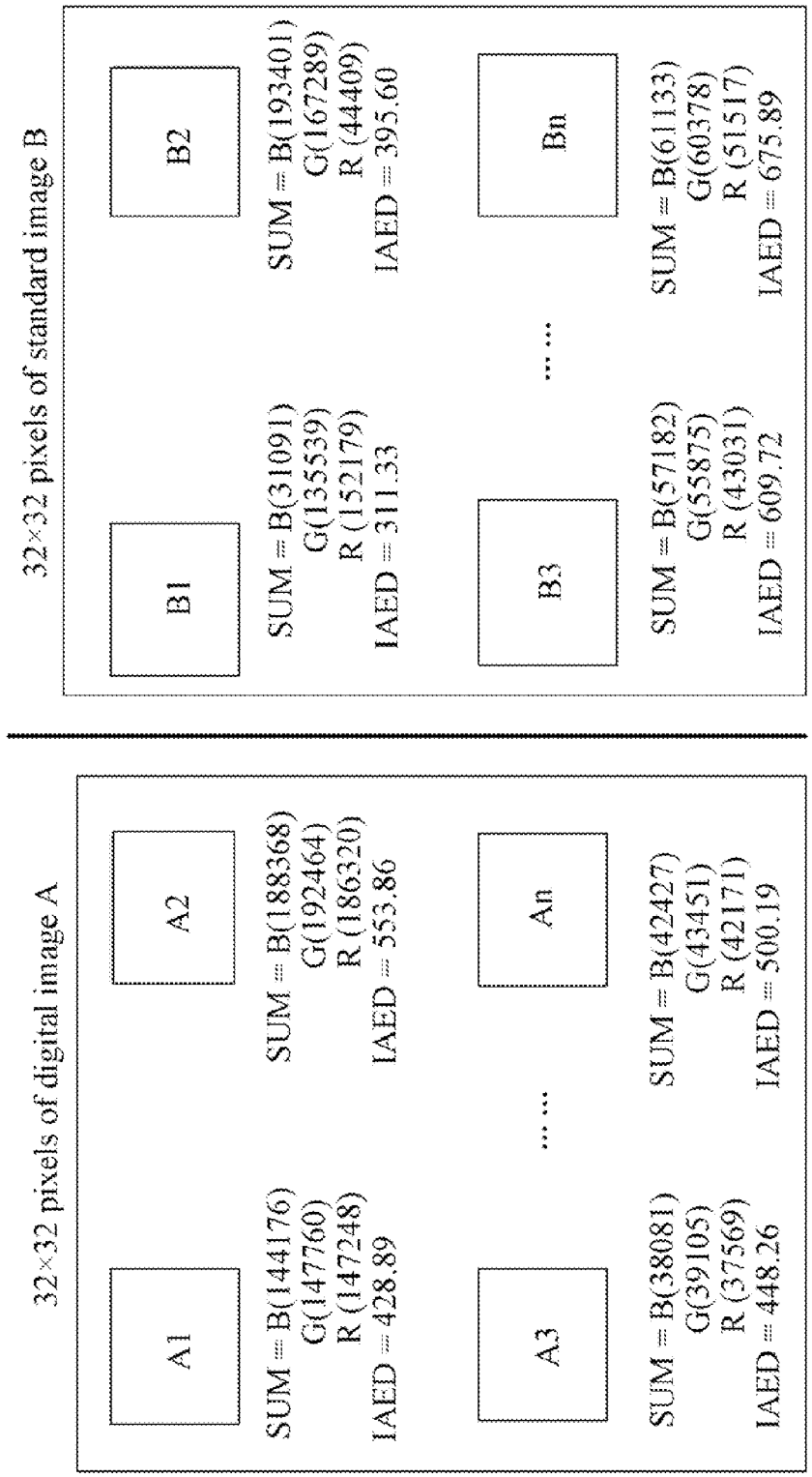
FIG. 4 is a schematic diagram illustrating one example of a calculation of an IAED value of the digital image and a calculation of an IAED value of the standard image.

One example with respect to FIG. 4, assuming that the digital image has 32*32 pixels which are divided into An pixel blocks, the pixel value of the pixel block A1 based on the RGB channels may be described as R=147248, G=147760, and B=144176. The IAED value of the pixel block A1 calculates out as IAED=(R+G+B)/32/32=428.89. In the embodiment, the image calculation module 112 calculates the IAED value of the R channel of the digital image as IAED_a_R=R/32/32=147248/32/32=143.80, the IAED value of the G channel of the digital image as IAED_a_G=G/32/32=144760/32/32=141.37, and the IAED value of the B channel of the digital image as IAED_a_B=B/32/32=144176/32/32=140.80.

Furthermore, assuming that the standard image has 32*32 pixels divided into Bn pixel blocks, the pixel values of the pixel block Bn based on the RGB channels may be described as R=152179, G=135539, and B=31091. In the embodiment, the image calculation module 112 calculates the IAED value of the R channel of the standard image as IAED_b_R=R/32/32=152179/32/32=148.61, the IAED value of the G channel of the standard image as IAED_b_G=G/32/32=135539/32/

32=132.36, and the IAED value of the B channel of the standard image as IAED_b_B=31091/32/32=30.36.

The image calculation module 112 is further operable to calculate a difference D_R between the values of IAED_a_R and IAED_b_R, a difference D_G between the values of IAED_a_G and IAED_b_G, and a difference D_B between the values of IAED_a_B and IAED_b_B. In the embodiment, the difference D_R is solved as IAED_a_R minus IAED_b_R=143.80−148.61=−4.81, the difference D_G is solved as IAED_a_G minus IAED_b_G=141.37−132.36=9.01, and the difference D_B is solved as IAED_a_B minus IAED_b_B=140.80−30.36=110.44.

The image conversion module 113 is operable to convert and optimize each of the pixel points of the digital image to generate an optimized pixel point according to the value of the IAED difference between the digital image and the standard image. In the embodiment, the image conversion module 113 creates an index (denoted as n_index) of all pixel points of the digital image, searches each pixel point in the digital image according to the index, and then converts the RGB value of each pixel point in An to an R'G'B' value to generate optimized pixel points in An', wherein R'=R minus D_R, G'=G minus D_G, and B'=B minus D_B. For example, if the pixel block An has a pixel point, of which the RGB value is (230,137,175), the image conversion module 113 optimizes the pixel point to an RGB value of (235,128,65).

The image generating module 114 is operable to integrate all the optimized pixel points An' to generate an overall optimized image, and to display the optimized image on the display device 14, or store the optimized image in the storage system 12. In the embodiment, the optimized image a higher level of brightness and contrast than that of the digital image captured by the image capturing device 2.

FIG. 3 is a flowchart of one embodiment of a method for optimizing images using the system of FIG. 1. In the embodiment, the method can process and convert digital images captured from the object 3 into optimized images when the digital images are subject to reflection of the surrounding light or the level changes of the surrounding light when the image is captured by the image capturing device 2. Depending on the embodiment, additional blocks may be added, others removed, and the ordering of the blocks may be changed.

In block S20, the image obtaining module 111 captures a digital image of the object 3 using the image capturing device 2, and obtains a standard image of the object 3 from a storage system 12. As shown in FIG. 3, the digital image may be different from the standard image. The digital image is captured from the object 3 that is influenced by reflection of a surrounding light or the level changes of the surrounding light, and the standard image is defined as a reference image of the object 3 having good brightness and contrast.

In block S21, the image calculation module 112 calculates an IAED value of the digital image based on the RGB channels of the digital image. As mentioned above, the IAED is defined as an image energy density of each pixel point of the image having N*N pixels, and is calculated by the equation IAED=(R+G+B)/N/N. In the embodiment, the image calculation module 112 calculates an IAED_a_R value for the R channel of the digital image, an IAED_a_G value for the G channel of the digital image, and an IAED_a_B value for the B channel of the digital image.

In block S22, the image calculation module 112 calculates an IAED value of the standard image based on the RGB channels of the standard image. In the embodiment, the image calculation module 112 calculates an IAED_b_R value of the R channel of the standard image, an IAED_b_G value of the G channel of the standard image, and an IAED_b_B value of the B channel of the standard image.

In block S23, the image calculation module 112 calculates difference D_R between the values of IAED_a_R and IAED_b_R, a difference D_G between the values of IAED_a_G and IAED_b_G, and a difference D_B between the values of IAED_a_B and IAED_b_B. In the embodiment, the difference D_R is solved as IAED_a_R minus IAED_b_R=143.80−148.61=−4.81, the difference D_G is solved as IAED_a_G minus IAED_b_G=141.37−132.36=9.01, and the difference D_B is solved as IAED_a_B minus IAED_b_B=140.80−30.36=110.44.

In block S24, the image conversion module 113 creates an index (denoted as n_index) for all the pixel points of the digital image, and searches each pixel point in the digital image according to the index, i.e., sets n_Index=1 to represent the first pixel point of the digital image.

In block S25, the image conversion module 113 converts and optimizes the RGB values each pixel point in An into R'G'B' values in An', wherein R'=R minus D_R, G'=G minus D_G, and B'=B minus D_B. For example, if the pixel block An has a particular pixel point with RGB values of (230,137,175), the image conversion module 113 converts and optimizes that pixel point into values of (235,128,65).

In block S26, the image conversion module 113 determines whether all the pixel points of the digital image have been converted by checking the index. If the index n_Index is less than N, where N represents the total number of pixel points of the digital image, block S27 is implemented, but if the index n_Index is equal to N, block S28 is implemented.

In block S27, the image conversion module 113 calculates n_Index=n_Index+1 to control the index to search for the next pixel point of the digital image, until all the pixel points are optimal.

In block S28, the image generating module 114 integrates all the optimized pixel points to generate an optimized image, and displays the optimized image on the display device 14, or stores the optimized image to the storage system 12. As such, the optimized image has a similar brightness and contrast to the digital image of the object 3 captured by the image capturing device 2.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, the computing device connected to an image capturing device, the computing device comprising: a storage system; at least one processor; and
   one or more programs stored in the storage system and executable by the at least one processor, the one or more programs comprising:
   an image obtaining module operable to capture a digital image of an object using the image capturing device, and obtain a standard image of the object from the storage system;
   an image calculation module is operable to calculate an image average energy density (IAED) value of the digital image based on RGB (red, green, blue) channels of the digital image, and an IAED value of the standard image based on RGB channels of the standard image, and calculate a difference value between the IAED value of the digital image and the IAED value of the standard image, wherein the IAED value of the digital image is an image energy density of each pixel point of the digital image, and the IAED value of the standard image is an image energy density of each pixel point of the standard image; an image conversion module operable to optimize each pixel point of the digital image to generate an optimized pixel point according to the IAED difference value of the digital image and the standard image; and an image generating module operable to integrate all the optimized pixel points to generate an optimized image, and display the optimized image on a display device of the computing device, wherein an IAED value is calculated by a calculation equation IAED=(R+G+B)/N/N, wherein R represents a pixel value of an R channel, G represents a pixel value of a G channel, B represents a pixel value of a B channel, and N represents a total number of pixel points of the image.

2. The computing device according to claim 1, wherein the IAED value of the digital image comprises an IAED value of the R channel of the digital image, an IAED value of the G channel of the digital image, and an IAED value of the B channel of the digital image.

3. The computing device according to claim 2, wherein the IAED value of the standard image comprises an IAED value of the R channel of the digital image, an IAED value of the G channel of the standard image, and an IAED value of the B channel of the standard image.

4. The computing device according to claim 3, wherein the IAED difference value comprises a difference value D_R between the IAED value of the R channel of the digital image and the IAED value of the R channel of the standard image, a difference value D_G between the IAED value of the G channel of the digital image and the IAED value of the G channel of the standard image, and a difference value D_B between the IAED value of the B channel of the digital image and the IAED value of the B channel of the standard image.

5. The computing device according to claim 1, wherein the image conversion module is further operable to create an index for each pixel point of the digital image, search each pixel point in the digital image according to the index, and control the index to search for the next pixel point of the digital image until all the optimized pixel points have been converted.

6. A computerized method for optimizing images captured by an image capturing device, the method comprising:

capturing a digital image of an object using the image capturing device, and obtaining a standard image of the object from a storage system of a computing device;

calculating an image average energy density (IAED) value of the digital image based on RGB (red, green, blue) channels of the digital image, wherein the IAED value of the digital image is an image energy density of each pixel point of the digital image;

calculating an IAED value of the standard image based on RGB channels of the standard image, wherein the IAED value of the standard image is an image energy density of each pixel point of the standard image;

calculating a difference value between the IAED value of the digital image and the IAED value of the standard image;

optimizing each pixel point of the digital image to generate an optimized pixel point according to the IAED difference value of the digital image and the standard image; and integrating all the optimized pixel points to generate an optimized image, and displaying the optimized image on a display device of the computing device wherein an IAED value is of an image is calculated by a calculation equation IAED=(R+G+B)/N/N, wherein R represents a pixel value of an R channel, G represents a pixel value of a G channel, and B represents a pixel value of a B channel, and N represents a total number of pixel points of the image.

7. The method according to claim 6, wherein the IAED value of the digital image comprises an IAED value of the R channel of the digital image, an IAED value of the G channel of the digital image, and an IAED value of the B channel of the digital image.

8. The method according to claim 7, wherein the IAED value of the standard image comprises an IAED value of the R channel of the digital image, an IAED value of the G channel of the standard image, and an IAED value of the B channel of the standard image.

9. The method according to claim 8, wherein the IAED difference value comprises a difference value D_R between the IAED value of the R channel of the digital image and the IAED value of the R channel of the standard image, a difference value D_G between the IAED value of the G channel of the digital image and the IAED value of the G channel of the standard image, and a difference value D_B between the IAED value of the B channel of the digital image and the IAED value of the B channel of the standard image.

10. The method according to claim 6, further comprising:

creating an index for each pixel point of the digital image;

determining whether all the pixel points of the digital image are converted by checking whether the index is less than N, wherein N represents a total number of pixel points of the digital image; and controlling the index to search for the next pixel point of the digital image until all the optimized pixel points have been converted.

11. A non-transitory computer-readable medium having stored thereon instructions that, when executed by at least one processor of a computing device, causes the method for optimizing images captured by an image capturing device, the method comprising:

capturing a digital image of an object using the image capturing device, and obtaining a standard image of the object from a storage system of the computing device;

calculating an image average energy density (IAED) value of the digital image based on RGB (red, green, blue) channels of the digital image, wherein the IAED value of the digital image is an image energy density of each pixel point of the digital image;

calculating an IAED value of the standard image based on RGB channels of the standard image, wherein the IAED value of the standard image is an image energy density of each pixel point of the standard image;

calculating a difference value between the IAED value of the digital image and the IAED value of the standard image;

optimizing each pixel point of the digital image to generate an optimized pixel point according to the IAED difference value of the digital image and the standard image; and integrating all the optimized pixel points to generate an optimized image, and displaying the optimized image on a display device of the computing device, wherein an IAED value is calculated by a calculation equation IAED=(R+G+B)/N/N, wherein R represents a pixel value of an R channel, G represents a pixel value of a G channel, and B represents a pixel value of a B channel, and N represents a total number of pixel points of the image.

12. The non-transitory computer-readable medium according to claim 11, wherein the IAED value of the digital image comprises an IAED value of the R channel of the digital image, an IAED value of the G channel of the digital image, and an IAED value of the B channel of the digital image.

13. The non-transitory computer-readable medium according to claim 12, wherein the IAED value of the standard image comprises an IAED value of the R channel of the digital image, an IAED value of the G channel of the standard image, and an IAED value of the B channel of the standard image.

14. The non-transitory computer-readable medium according to claim 13, wherein the IAED difference value comprises a difference value D_R between the IAED value of the R channel of the digital image and the IAED value of the R channel of the standard image, a difference value D_G between the IAED value of the G channel of the digital image and the IAED value of the G channel of the standard image, and a difference value D_B between the IAED value of the B channel of the digital image and the IAED value of the B channel of the standard image.

15. The non-transitory computer-readable medium according to claim 11, wherein the method further comprises:
    creating an index for each pixel point of the digital image;
    determining whether all the pixel points of the digital image are converted by checking whether the index is less than N, wherein N represents a total number of pixel points of the digital image; and
    controlling the index to search for the next pixel point of the digital image until all the optimized pixel points have been converted.

* * * * *